(12) United States Patent
Gray et al.

(10) Patent No.: US 7,566,086 B2
(45) Date of Patent: Jul. 28, 2009

(54) VEHICLE SEAT MOUNTING SYSTEM

(75) Inventors: Larry E. Gray, Brownsburg, IN (US); Christopher W. Foye, Indianapolis, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 494 days.

(21) Appl. No.: 11/379,637

(22) Filed: Apr. 21, 2006

(65) Prior Publication Data

US 2006/0255614 A1    Nov. 16, 2006

Related U.S. Application Data

(60) Provisional application No. 60/680,157, filed on May 12, 2005.

(51) Int. Cl.
  *B60N 2/07*   (2006.01)
  *B60N 2/075*  (2006.01)
  *B60N 2/08*   (2006.01)

(52) U.S. Cl. ............... 296/65.13; 296/65.03; 296/65.14

(58) Field of Classification Search ............... 296/65.01, 296/65.12–65.14, 64, 63; 297/344.1, 344.11; 248/429, 430
See application file for complete search history.

(56) References Cited

U.S. PATENT DOCUMENTS

| | | | |
|---|---|---|---|
| 1,446,833 A * | 2/1923 | Carlson | 296/63 |
| 1,710,616 A * | 4/1929 | Guernsey | 296/178 |
| 6,189,852 B1 * | 2/2001 | Hopley et al. | 248/430 |
| 6,227,614 B1 * | 5/2001 | Rubin | 297/172 |
| 6,457,765 B1 | 10/2002 | Bergquist et al. | |
| 6,460,922 B1 | 10/2002 | Demick | |
| 6,488,250 B1 * | 12/2002 | Munch | 248/430 |
| 6,582,004 B1 * | 6/2003 | Hamm | 296/65.08 |
| 6,629,721 B1 * | 10/2003 | Macey | 297/15 |
| 6,648,394 B2 * | 11/2003 | Lejeune et al. | 296/65.13 |
| 6,655,739 B2 * | 12/2003 | Furukawa | 297/344.11 |
| 6,695,379 B1 * | 2/2004 | Ishida | 296/65.14 |
| 6,767,040 B1 * | 7/2004 | Freijy | 296/65.09 |
| 7,073,764 B2 * | 7/2006 | Matsushiro | 248/424 |
| 7,172,155 B2 * | 2/2007 | Feist et al. | 244/118.6 |
| 7,229,117 B2 * | 6/2007 | Okuda et al. | 296/64 |
| 7,252,318 B2 * | 8/2007 | Sumida et al. | 296/64 |
| 7,390,063 B2 * | 6/2008 | Behrens | 297/440.1 |
| 2002/0057007 A1 * | 5/2002 | Furukawa | 297/344.11 |
| 2008/0036232 A1 * | 2/2008 | Randjelovic et al. | 296/65.13 |

* cited by examiner

*Primary Examiner*—Glenn Dayoan
*Assistant Examiner*—Gregory Blankenship
(74) *Attorney, Agent, or Firm*—Barnes & Thornburg LLP

(57) ABSTRACT

A seat mounting system for a vehicle comprises an elongated track mounted to a floor of the vehicle and a number of seat coupling members. The elongated track defines a length and a continuous first channel along its length. Each of the number of seat coupling members is configured to be received and retained within the first channel anywhere along the length of the elongated track, and to be secured to a vehicle seat frame.

16 Claims, 7 Drawing Sheets

VEHICLE SEAT MOUNTING SYSTEM

CROSS-REFERENCE TO RELATED U.S. PATENT APPLICATION

This patent application claims priority to, and the benefit of, provisional patent application Ser. No. 60/680,157, filed May 12, 2005, the disclosure of which is incorporated herein by reference.

FIELD OF THE INVENTION

The present invention relates generally to systems for mounting seats to a vehicle, and more specifically to a track system for mounting seats to a vehicle

BACKGROUND

It is generally known to mount seats to any of a variety of vehicles. For example, seats may typically be mounted to school buses by bolting the seats directly to the floor of the bus. Alternatively, school bus seats may also be mounted to the bus by bolting one end of the seat to the bus floor and bolting the other end of the seat to the wall of the bus. It is desirable to provide a seat mounting system that distributes the load on any such school bus seat over a greater portion of the school bus floor than that using the conventional direct bolting technique.

SUMMARY

The present invention may comprise one or more of the features recited in the attached claims, and/or one or more of the following features and combinations thereof. A seat mounting system for a vehicle may comprise an elongated track mounted to a floor of the vehicle and a number of seat coupling members. The elongated track may define a length and a continuous first channel along its length. Each of the number of seat coupling members may be configured to be received and retained within the first channel anywhere along the length of the elongated track, and to be secured to a vehicle seat frame.

The seat mounting system may further comprise at least one cap member interposed between the first channel and the vehicle seat frame, the at least one cap member may extend at least partially about the first channel to inhibit distortion of the first channel under load of the vehicle seat.

The seat mounting system may further comprise a number of sections of the elongated track mounted to the floor of the vehicle in an end-to-end relationship.

Each of the number of seat coupling members may define a head member and a shaft member. The head member may be configured to be received and retained within the first channel and the shaft member may be configured to be secured to the vehicle seat frame. The head member of each of the number of seat coupling members may be configured to be received within the first channel with a first orientation, and then manipulated to a second orientation different from the first orientation to secure the corresponding seat coupling member to the elongated track. The second orientation may be substantially perpendicular to the first orientation. In any case, the seat mounting system may further comprise a number of nuts each configured to engage a corresponding one of the number of shaft members to secure the vehicle seat frame to the elongated track.

The seat mounting system may further comprise a track cap configured to engage the track adjacent to an opening into the first channel. The track cap may provide a cover over the opening into the first channel.

The seat mounting system may further comprise a threshold interposed between the elongated track and a floor of the vehicle. The threshold may define a second channel configured to receive the elongated track therein. The threshold may define a sloped flange along each side of the second channel. The sloped flange may slope away from the elongated track toward the floor of the vehicle. In any case, the seat mounting system may further comprise at least one cap member interposed between the first channel and the vehicle seat frame. The at least one cap member may extend at least partially about the first channel to inhibit distortion of the first channel under load of the vehicle seat. The threshold may define a first notch along one side of the second channel and a second notch along an opposite side of the second channel. The first notch may be configured to receive therein one end of the at least one cap member and the second notch may be configured to receive therein an opposite end of the at least one cap member.

The continuous first channel of the elongated track may be configured to have the vehicle seat frame continuously adjustably positioned relative thereto.

One portion of the vehicle seat frame may be secured to the elongated track and another portion of the vehicle seat frame may be secured to a sidewall of the vehicle.

A seat mounting system for a vehicle may comprise a first elongated track mounted to a floor of the vehicle and a second elongated track mounted to a floor of the vehicle separately and apart from the first elongated track. The first elongated track may define a first length and a continuous first channel along the first length. The second elongated track may define a second length and a continuous second channel along the second length. A first number of seat coupling members may be configured to be received and retained within the first channel anywhere along the first length of the first elongated track. Each of the first number of seat coupling members may be configured to be secured to one portion of a vehicle seat frame. A second number of seat coupling members may be configured to be received and retained within the second channel anywhere along the second length of the second elongated track. Each of the second number of seat coupling members may be configured to be secured to another portion of the vehicle seat frame different than the one portion.

The seat mounting system may further comprise a first number of sections of the first elongated track mounted to the floor of the vehicle in an end-to-end relationship, and a second number of sections of the second elongated track mounted to the floor of the vehicle in an end-to-end relationship. Each of the first number of seat coupling members may define a head member and a shaft member. The head member of each of the first number of seat coupling members may be configured to be received and retained within the first channel and the shaft member of each of the first number of seat coupling members may be configured to be secured to the one portion of the vehicle seat frame. Each of the second number of seat coupling members may define a head member and a shaft member. The head member of each of the second number of seat coupling members may be configured to be received and retained within the second channel and the shaft member of each of the second number of seat coupling members may be configured to be secured to the another portion of the vehicle seat frame.

The seat mounting system may further comprise a first threshold interposed between the first elongated track and a floor of the vehicle, and a second threshold interposed between the second elongated track and the floor of the vehicle. The first threshold may define a second channel configured to receive the first elongated track therein. The second threshold may define a third channel therein configured to receive the second elongated track therein.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
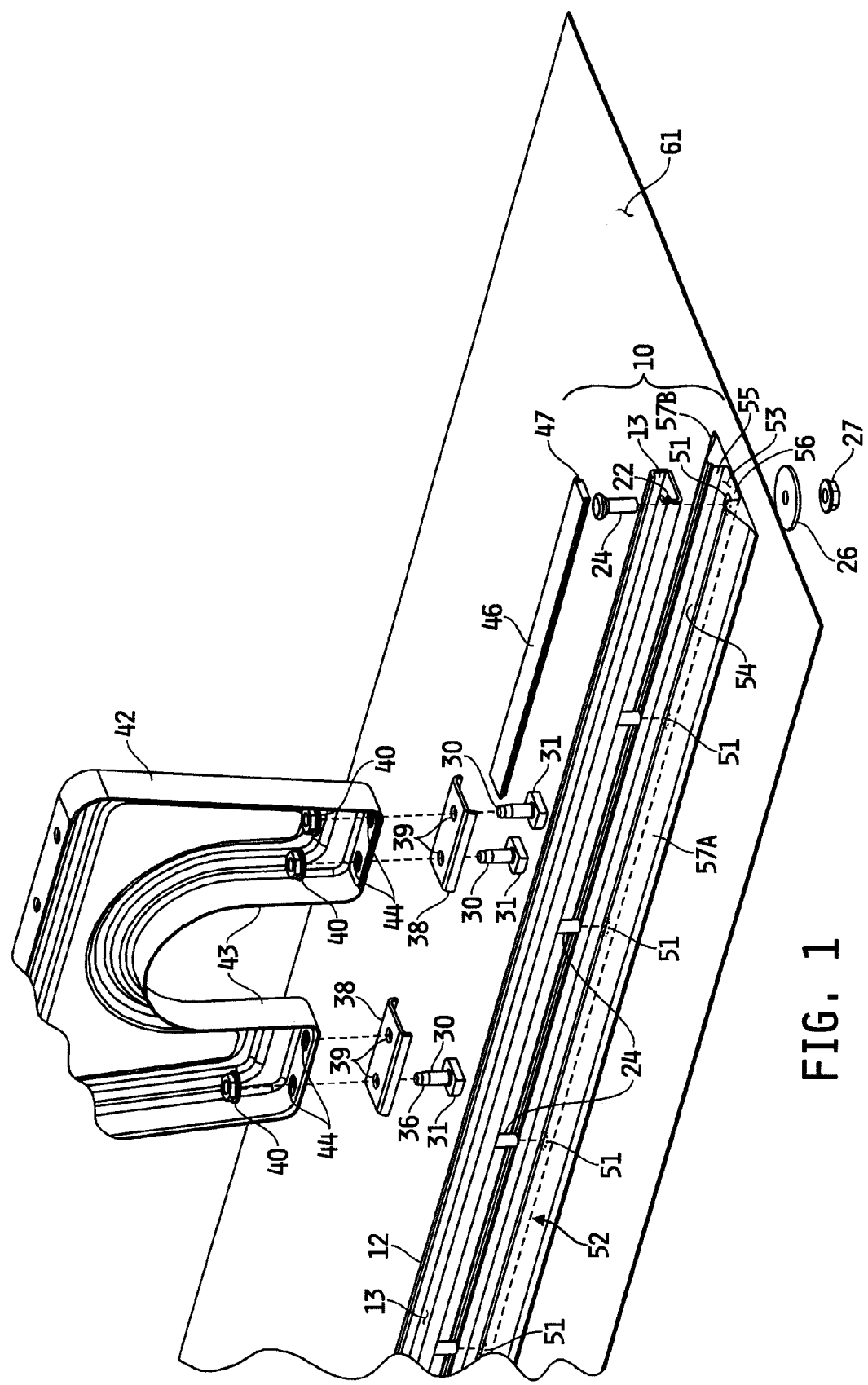
FIG. 1 is an exploded, perspective view of one illustrative embodiment of a vehicle seat mounting system.
Figure 2:
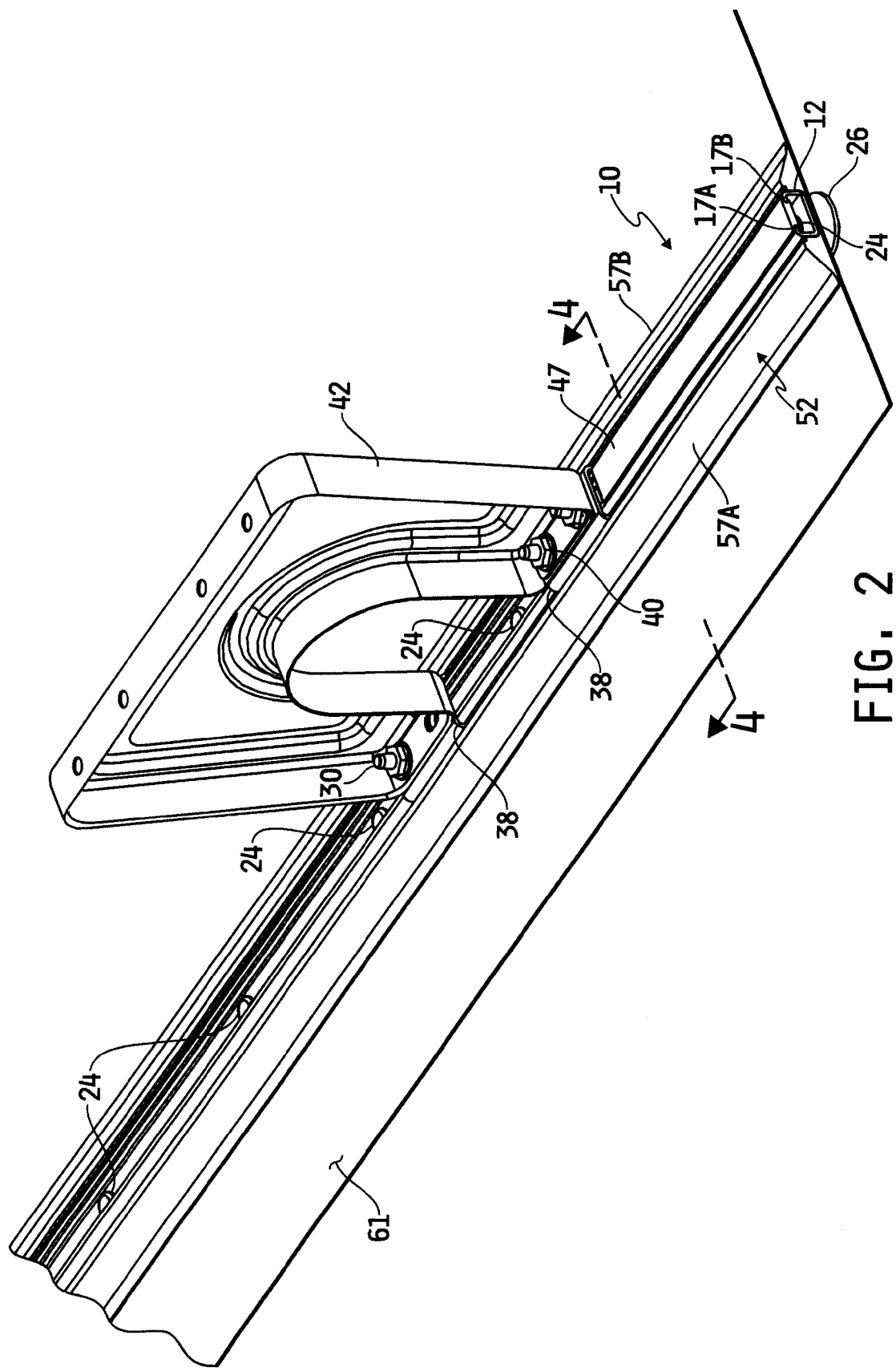
FIG. 2 is a perspective view of the embodiment of FIG. 1 in assembled form.
Figure 4:
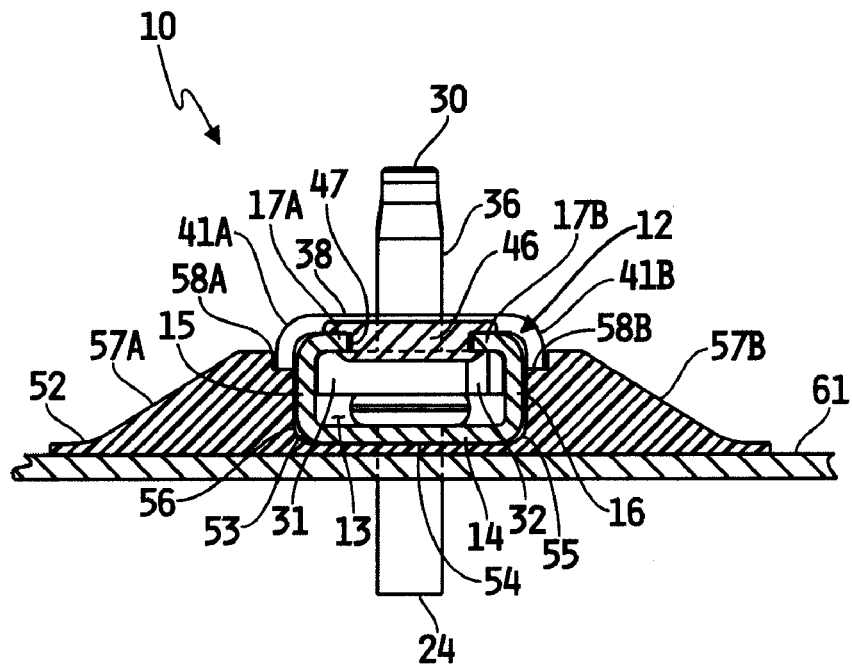
FIG. 4 is a sectional view of the illustrative seat mounting system of FIG. 2 taken along section lines 4-4.

FIGS. 1, 2 and 4 depict one illustrative embodiment of a vehicle seat mounting system 10. The mounting system 10 comprises an elongated track 12, a floor molding or threshold 52, floor coupling members 24, and seat coupling members 30. The floor molding or threshold 52 is illustratively extruded from plastic, although other materials may be used. In any case, the floor molding or threshold 52 defines a generally U-shaped and open-ended channel 53 having a pair of spaced apart side walls 55 and 56 extending upwardly from a bottom portion 54. Illustratively, the side walls 55, 56 may define notches 58B and 58A respectively therein adjacent to the open end of the channel 53. Further illustratively, the molding or threshold 52 defines a number of mounting apertures 51 therethrough and spaced along the length of the bottom portion 54. The number of mounting apertures 51 are configured to receive therethrough one or more floor coupling members 24. Additionally, the molding or threshold 52 may define sloping outer walls or flanges 57A and 57B on opposite sides of the channel 53 in order to provide a threshold between the floor 61 of the vehicle and the open top of the channel 53. Generally, the outer walls or flanges 57A and 57B slope downwardly from a top portion of the channel 53 toward the floor 61 of the vehicle.

The channel 53 of the molding or threshold 52 is configured to receive therein the elongated track 12. The elongated track 12 has a bottom portion 14 from which a pair of spaced apart side walls 15 and 16 extending upwardly. End portions 17A and 17B of the sidewalls 15 and 16 respectively turn inwardly toward each other to form a channel 13 between the end portions 17A and 17B, the sidewalls 15, 16 and the bottom portion 14. The illustrated elongated track 12 thus has a C-shaped cross section defining the open channel 13 therein, although other cross-sectional shapes are contemplated. Illustratively, the elongated track 12 is form of a high strength steel, although other materials or material compositions may be used. The bottom portion 14 of the track 12 defines a number of mounting apertures 22 therethrough and spaced along the length of the bottom portion 14. The number of mounting apertures 22 are sized and configured to receive therethrough one of the floor coupling members 24. In the illustrated embodiment, the channel 53 of the molding or threshold 52 is sized and configured to receive the track 12 therein with the bottom portion 14 of the track 12 in contact with the bottom portion 54 of the molding or threshold 12. The number of mounting apertures 22 of the track 12 generally align with the number of apertures 51 defined through the molding or threshold 52. The floor coupling members 24 pass through the track apertures 22, through the mounting apertures 51, through the vehicle floor 61, through a washer 26 and then into engagement with a nut 27. The floor coupling members 24, in this embodiment, are threaded and may be advanced onto corresponding nuts 27, or vice versa, to securely couple together the track 12 and the molding 52 and to attach the coupled track 12 and molding 52 to the vehicle floor 61. Generally, the floor coupling members 24 may be, for example, knurled studs, bolts, tacks, nails, rivets, or other suitable coupler; the washer 26 may be a hardened washer or other suitable washer; and the nut 27 may be a flange nut, or other suitable nut. In an alternative embodiment, the floor coupling members 24 may be configured to directly engage the vehicle floor 61. Those skilled in the art will recognize that one or more other conventional structures and/or techniques may alternatively be used to mount the track 12 and molding or threshold 52 to the floor 61 of the vehicle, and any such conventional structures and/or techniques are contemplated by the present disclosure. Examples include, but are not limited to, glue, cement, welding and the like. In any case, it is desirable to secure sections of the track 12; e.g., several feet in length, to the vehicle floor 61 at various points along the length of the track 12; e.g., every 15-18 inches or so. The mounted track 12 thus spreads any load on a vehicle seat mounted thereto across at least a portion of the floor 16 of the vehicle. The continuous channel 13 of the track 12 additionally provides for continuous; i.e., infinite, adjustability in the positioning of vehicle seats relative to the track 12.

In the embodiment illustrated in FIGS. 1, 2 and 4, a number of seat coupling members 30 are shown for coupling or mounting a pair of legs of a vehicle seat frame 42 to the track 12. The number of seat coupling members 30 each define a head member 31 configured to be received and retained within the channel 13 of the track 12 as will be described in greater detail hereinafter with respect to FIGS. 6 and 7. In the illustrated embodiment, two caps 38 are provided, and each define a pair of apertures 39 therethrough. The apertures 39 are positioned relative to the caps 38 so that they align with corresponding apertures 44 defined through each leg 43 of the seat frame 42. In the illustrated embodiment, the seat coupling members 30 are at least partially threaded, and extend through the caps 38, through the apertures 44 and into threaded engagement with a corresponding number of nuts 40. The nuts 40 are advanced onto the seat coupling members 30 to the track 12 as illustrated in FIG. 2. Those skilled in the art will recognize that one or more other conventional structures and/or techniques may alternatively be used to mount the legs 43 of the seat frame 42 to the track 12, and any such conventional structures and/or techniques are contemplated by the present disclosure.

As most clearly shown in FIG. 4, each of the caps 38 define downwardly extending sidewalls 41A and 41B on opposite sides thereof. In the illustrated embodiment, the notches 58A and 58B in the sidewalls 56 and 55 respectively of the molding or threshold 52 are sized to receive therein the sidewalls 41A and 41B respectively of the caps 38. The sidewalls 41A and 41B of the caps 38 thus extend around the end portions 17A and 17B and at least partially down the sidewalls 15 and 16 respectively when the caps 38 are positioned over the open channel 13 of the track 12. The sidewalls 41A and 41B of the caps 38 thus inhibit spreading open of the open channel 13 of the track 12 under load.

Track caps 46, which illustratively are extruded from plastic and comprise notches or channels 47 running along their lengths, are configured to receive therein the end portions 17A and 17B of the walls 15 and 16 respectively of the track 12. The track caps 46 thus form a cover over open portions of the channels 13 of the track 12 as shown. The caps 46 may be of various lengths to accommodate the desired spacing between the seats and the spacing between the legs 43, for example. The press-fitted caps 46 may be snapped onto or off the track 12 as desired.

Figure 3:
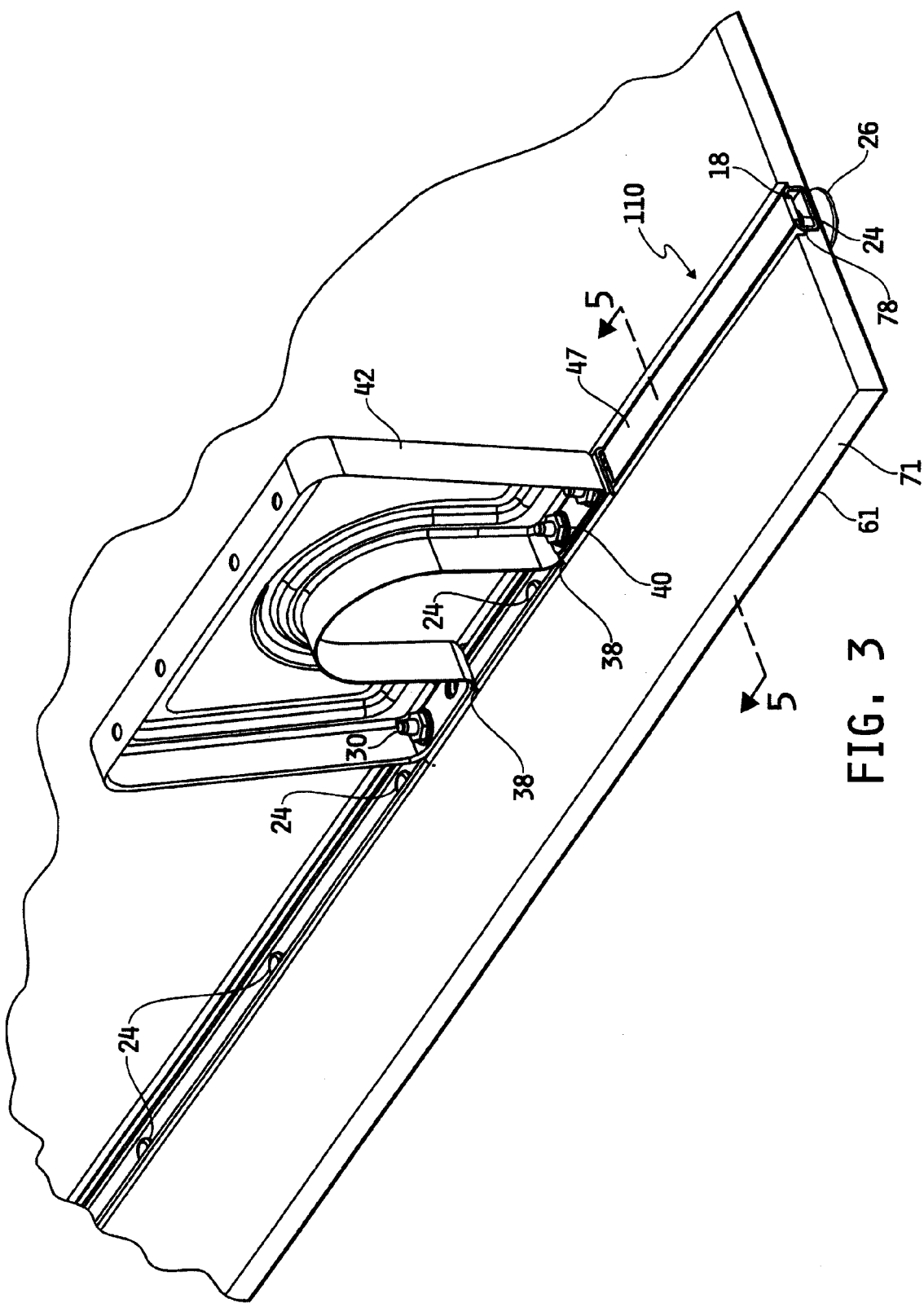
FIG. 3 is a perspective view of another illustrative embodiment of the vehicle seat mounting system in assembled form.
Figure 5:
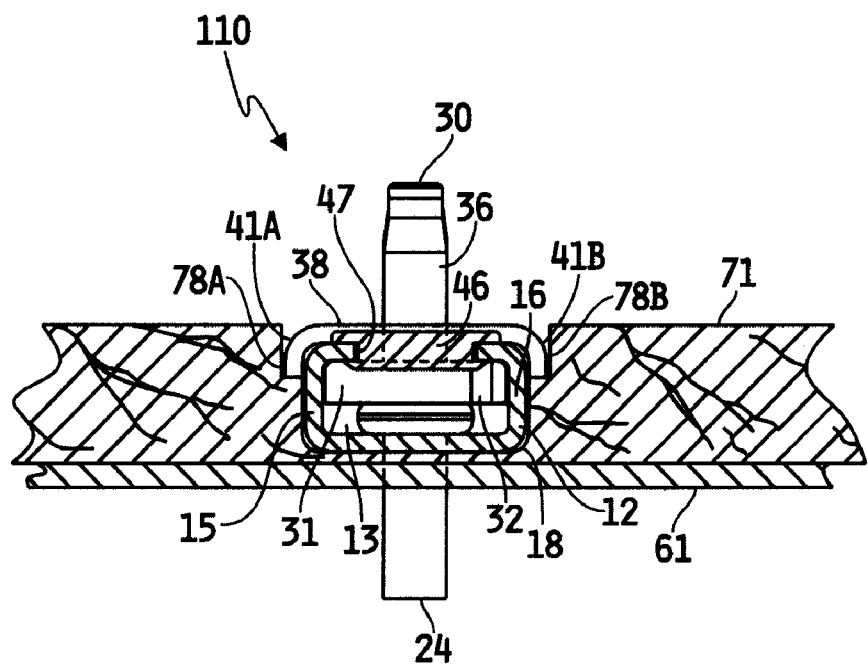
FIG. 5 is a sectional view of the illustrative seat mounting system of FIG. 3 taken along section lines 5-5.

Referring now to FIGS. 3 and 5, another illustrative embodiment of a vehicle seat mounting system 110 is shown. In the illustrated embodiment, the seat mounting system 110 comprises a track assembly 12, floor coupling members 24, and seat coupling members 30, all of which operate substantially as described above with respect to the seat mounting system 10 of FIGS. 1, 2 and 4. Like numbers are therefore used to identify like components. In the embodiment illustrated in FIGS. 3 and 5, the molding or threshold 52 is omitted and the track 12 is received within a channel 18 defined through a floor 71 member that is mounted to the floor 61 of the vehicle. Alternatively, the channel 18 may be formed in the floor 16, and the track 12 may be received within the channel 18 and mounted directly to the floor 16. In either case, the channel 18 defines, in the illustrated embodiment, a pair of notches 78A and 78B in the opposing channel sides near the opening of the channel 18. The notches 78A and 78B are configured and sized similarly to the notches 58A and 58B described hereinabove to receive therein the sidewalls 41A and 41B respectively of the caps 38. In any case, it is desirable to secure sections of the track 12; e.g., several feet in length, to the vehicle floor 61 at various points along the length of the track 12; e.g., every 15-18 inches or so. The mounted track 12 thus spreads any load on a vehicle seat mounted thereto across at least a portion of the floor 16 of the vehicle. The continuous channel 13 of the track 12 additionally provides for continuous; i.e., infinite, adjustability in the positioning of vehicle seats relative to the track 12. Alternatively or additionally, the seat bottom (not shown) to which the seat frame 42 is mounted may likewise have sections of the track 12 mounted thereto. In this embodiment, the seat frame 42 may be adjustably mounted to the seat bottom (not shown) similarly as described with respect to the mounting of the seat frame legs 43 to the track 12.

Figure 6:
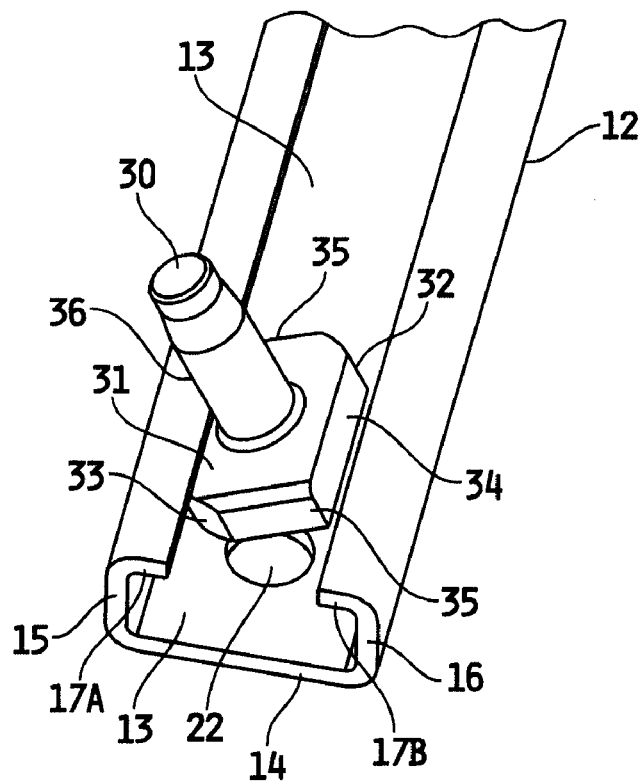
FIG. 6 is a perspective view of the seat mounting portion of the illustrative mounting systems of any of FIGS. 1-6.
Figure 7:
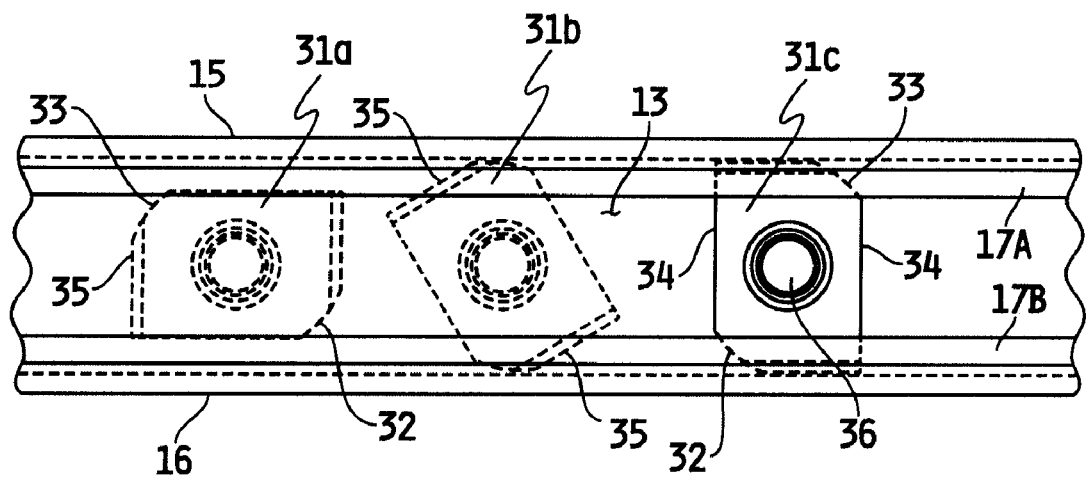
FIG. 7 is a diagrammatic top view of the seat mounting portion of FIG. 6 illustrating operation of a seat mounting coupler.

Referring now to FIGS. 6 and 7, insertion of seat coupling member 30 into the channel 13 will now be described. The seat coupling member 30 comprises a generally rectangular-shaped head member 31 having a pair of spaced apart and substantially parallel long sides 34, and substantially perpendicular thereto, a pair of spaced apart and substantially parallel short sides 35. One corner 32 of the head 31 is rounded off, as is another corner 33 located diagonally across from corner 32. Each of the sides 34, 35 have a height substantially the same as, or slightly less than, the height of the channel 13, with long sides 34 having a length substantially the same as, or slightly less than, the width of the channel as measured between sidewalls 15, 16, and with the short sides 35 having a length substantially the same as the width of the opening between the end portions 17A and 17B. It will be appreciated, therefore, that the head 31 is designed to fit snugly within the channel 13. The coupler 30 is inserted in the channel 13 by aligning the long sides 34 with the longitudinal axis of the channel 13 and by tilting the coupler 30 toward either of the sidewalls 15 or 16 in order to pass the head 31 through the opening between the end portions 17A and 17B and under whichever end portion 17A or 17B the coupler 30 is tilted toward. For example, as illustrated in FIG. 6, the coupler 30 is tilted toward sidewall 15 and the long side 34 adjacent to sidewall 15 is passed under the end portion 17A, which allows the other side 34 to pass through opening between the end portions 17A and 17B as the coupler 30 is tilted away from the sidewall 15 and back to the upright position until its head 31 rests within the channel 13 abutting the bottom portion 14. This position is depicted in FIG. 7 as 31a. It is equally acceptable to insert the coupler 30 by tilting it toward the sidewall 16 and slipping the head 31 under the end portion 17B.

The opposing rounded corners 32, 33 reduce the length of the long ends 34 by an amount sufficient to allow the coupling member 30 to be turned within the channel 13 in a clockwise direction, as depicted by position 31b, until the squared corners of the coupler's head 31 abut the sidewalls 15, 16, as depicted by position 31c, thereby stopping the further turning of the coupling member 30 within the channel 13. The coupling member 30 is essentially locked in position 31c in that the head 31 cannot be turned further in the clockwise direction within the channel 13, and can only be turned in the counterclockwise direction after overcoming friction created by the snug fit within the channel 13. It will be appreciated that the head 31 alternatively could be positioned in channel 13 as just describe but with corner 32 adjacent to the sidewall 15 which would allow the head 31 to be substantially locked by turning it counterclockwise. In all events, once the nuts 40 are tightened around the respective coupling members 30, as described hereinabove, the heads 31 are completely locked within the channel 13. Conversely, loosening the nuts 40 allows the heads 31 to be unlocked from the channel 13 and the coupling devices to be moved along the length of the track 12 as desired.

Figure 8:
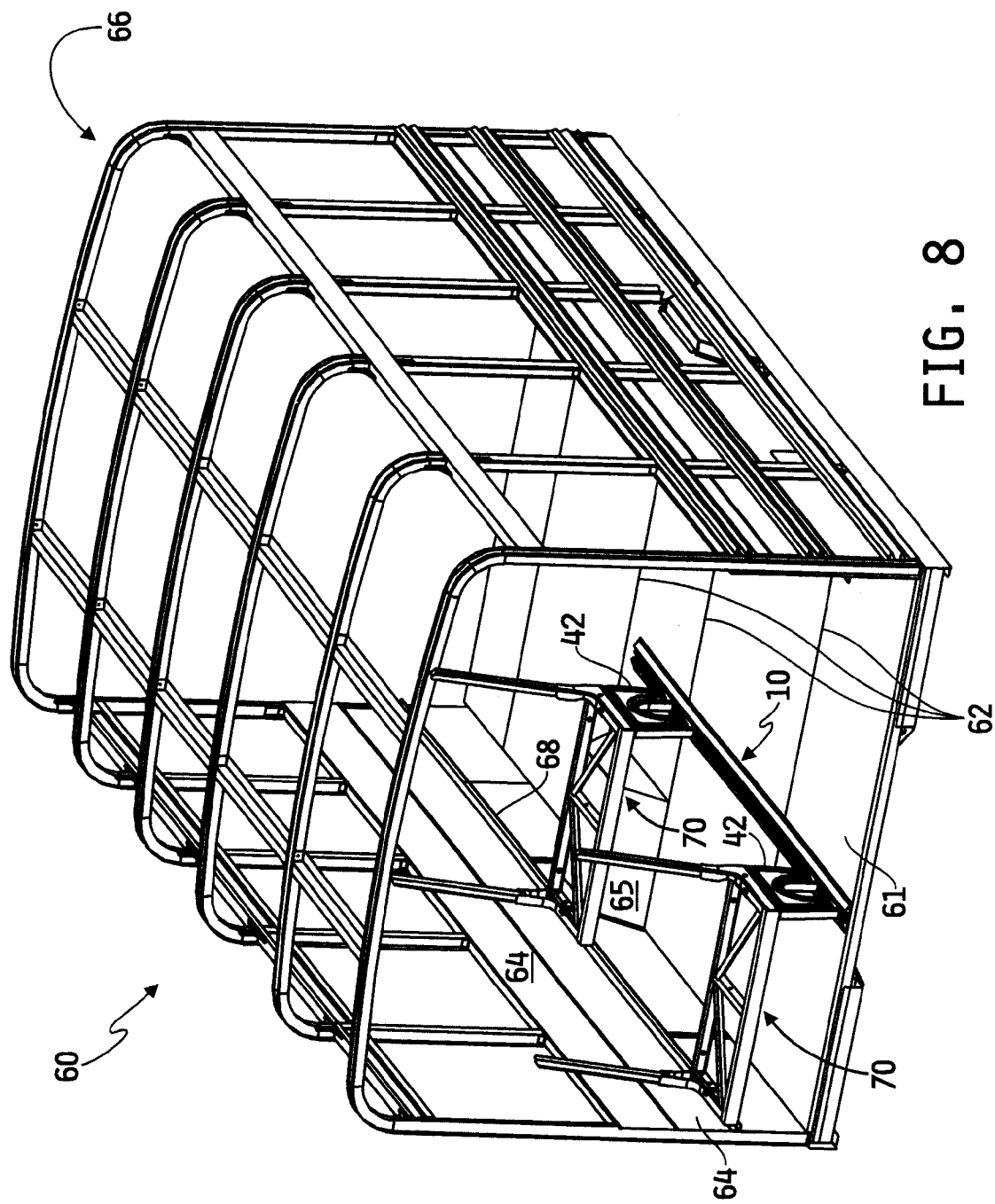
FIG. 8 is a perspective view of an illustrative seat arrangement utilizing any of the seat mounting systems of FIGS. 1-6 to mount a seat in an illustrative vehicle.

Referring to FIG. 8, an example of a vehicle seat mounting configuration illustrating seats mounted to a vehicle 60 is shown using the seat mounting system 10 shown and described hereinabove to mount one side of the seat 70 to the floor 61 of the vehicle 60, while the other side of the seat 70 is mounted to a wall 64 of the vehicle 60. The seat 70 may be mounted to the wall 64 using either a conventional rail system known to those skilled in the art, or an adaptation of one of the seat mounting systems 10, 110 described herein as would be adaptable by those skilled in the art. For example, the system 10 could be mounted to the vehicle sidewall 64 with the opening of the channel 13 facing inwardly toward the center of the vehicle such that the coupling members 30 would extend outwardly away from the sidewall 64 and through apertures in the side of the seat frame. In such a case, a flange connected to the seat frame could also extend over and receive support from the system 10. Alternatively, the system 10 could be mounted to the sidewall 64 with opening of the channel 13 facing upwardly toward the top of the vehicle 66 such that the coupling members 30 extend upwardly away from the floor 61 and through apertures in the bottom of the seat frame 42 or a flange attached thereto.

Figure 9:
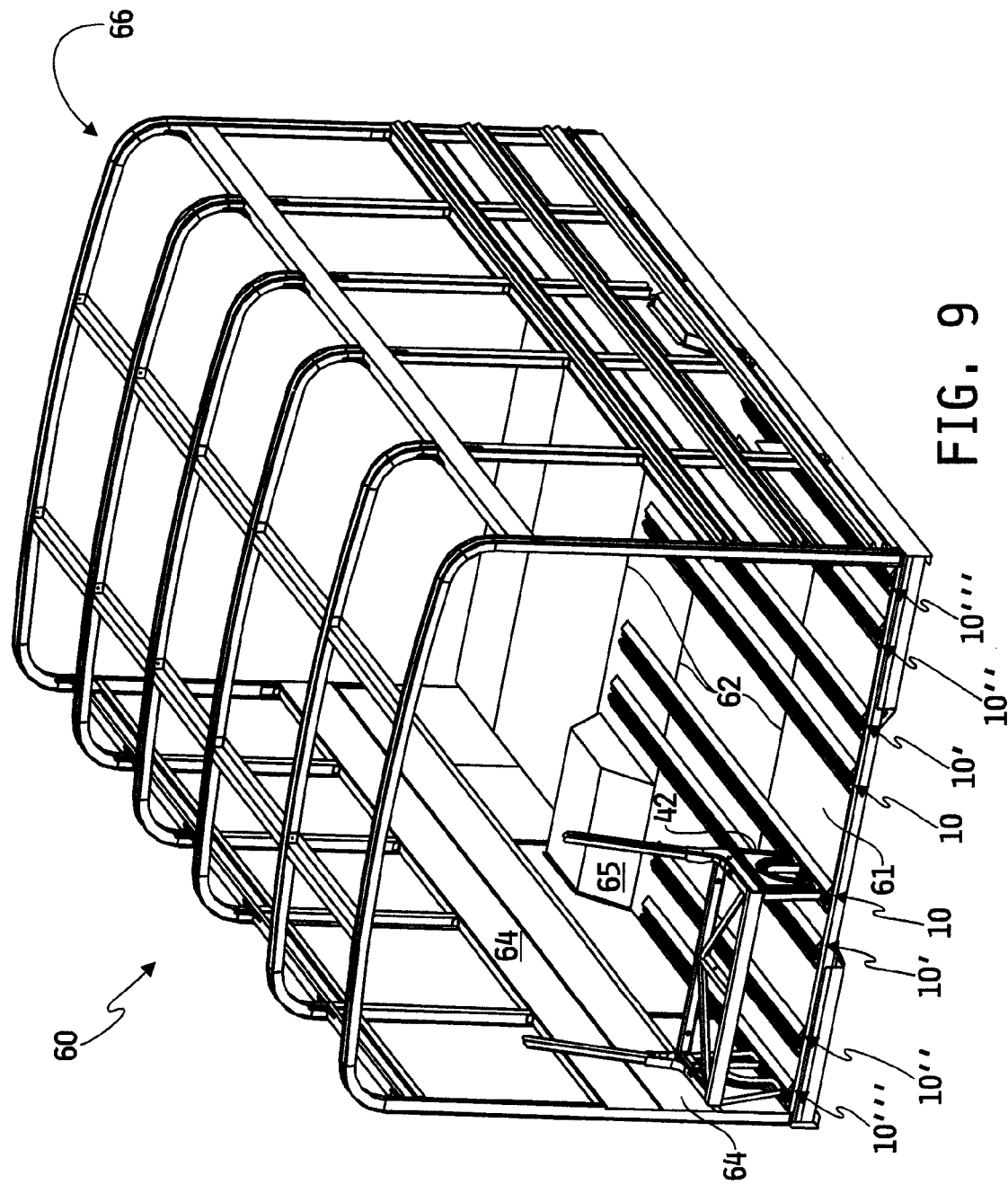
FIG. 9 is a perspective view of another illustrative seat arrangement utilizing any of the seat mounting systems of FIGS. 1-6 to mount a seat in an illustrative vehicle.

Referring to FIG. 9, another example of a vehicle seat mounting configuration illustrating seats mounted to the vehicle 60 is shown using the seat mounting system 10 or 110 to allow for mounting of seats of different sizes, alone or in combination, to the vehicle. For example, a two person seat could be mounted using the inner system 10', 10" or 110', 110", while a three-person seat may be mounted using the outer system 10, 10''' or 110, 110'''. It will be apparent that the longitudinal orientation of the tracks 12 illustrated in FIGS. 8 and 9 allows the tracks 12 to be mounted to the floor 61 despite the location of any seams 62 or wheel wells 65 or other obstacles. In addition, the tracks 12 allow for infinite placement of seats along the length of the tracks 12 within the limits of the presence and size of other seats mounted on the same side of the vehicle 60. Other items may be mounted to the tracks 12, for example, wheel chairs, motorcycles, cargo netting, pallets, and the like.

Using one illustrative installation technique, an installer may drill predetermined apertures in the floor 61. The track 12 with the coupling members 24 pre-staked or inserted in the apertures 22 arranged in the same pre-determined pattern as the apertures in the floor may then be laid on the floor 61 to allow the couplers 24 to extend therethrough and through the washers 26 and nuts 27, which may then be tightened onto the coupling members 24 to a specified torque from underneath the floor 61. The seat coupling members 30 may then be inserted into the track 12, positioned along the length of the track 12 as desired, and then locked into position all as described herein. Caps 38 are then placed over the coupling members 30, which then pass through the apertures 44 of the seat mounting module 42. The nuts 40 are then tightened onto the coupling members 30 to secure the seat 70 to the floor 61 of the vehicle 60. Additional seats 70 may be placed in the same manner.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, one or more alternative structures for mounting the vehicle seat frame 42 to a section of track 12 are disclosed in co-pending and commonly owned U.S. Patent Application Ser. No. 60/680,173, entitled TRACK SYSTEM FOR MOUNTING SEATS AND SECURING WHEELCHAIRS TO A VEHICLE, the disclosure of which is incorporated herein by reference.

What is claimed is:

1. A seat mounting system for a vehicle comprising:
   an elongated track mounted to a floor of the vehicle, the elongated track defining a length and a continuous first channel along the length,
   a number of seat coupling members configured to be received and retained within the first channel anywhere along the length of the elongated track, each of the number of seat coupling members configured to be secured to a vehicle seat frame, and
   at least one cap member interposed between the first channel and the vehicle seat frame, the at least one cap member extending at least partially about the first channel to inhibit distortion of the first channel under load of the vehicle seat.

2. The seat mounting system of claim 1 further comprising a number of sections of the elongated track mounted to the floor of the vehicle in an end-to-end relationship.

3. The seat mounting system of claim 1 further comprising a track cap configured to engage the track adjacent to an opening into the first channel, the track cap providing a cover over the opening into the first channel.

4. A seat mounting system for a vehicle comprising:
   an elongated track mounted to a floor of the vehicle, the elongated track defining a length and a continuous first channel along the length, and
   a number of seat coupling members configured to be received and retained within the first channel anywhere along the length of the elongated track, each of the number of seat coupling members configured to be secured to a vehicle seat frame, each of the number of seat coupling members defining a head member and a shaft member, the head member configured to be received and retained within the first channel and the shaft member configured to be secured to the vehicle seat frame, wherein the head member of each of the number of seat coupling members is configured to be received within the first channel with a first orientation, and then manipulated to a second orientation different from the first orientation to secure the corresponding seat coupling member to the elongated track.

5. The seat mounting system of claim 4 wherein the second orientation is substantially perpendicular to the first orientation.

6. The seat mounting system of claim 4 further comprising a number of nuts each configured to engage a corresponding one of the number of shaft members to secure the vehicle seat frame to the elongated track.

7. The seat mounting system of claim 4 wherein the continuous first channel of the elongated track is configured to have the vehicle seat frame continuously adjustably positioned relative thereto.

8. The seat mounting system of claim 4 wherein one portion of the vehicle seat frame is secured to the elongated track and another portion of the vehicle seat frame is secured to a sidewall of the vehicle.

9. A seat mounting system for a vehicle comprising:
   an elongated track mounted to a floor of the vehicle, the elongated track defining a length and a continuous first channel along the length,
   a number of seat coupling members configured to be received and retained within the first channel anywhere along the length of the elongated track, each of the number of seat coupling members configured to be secured to a vehicle seat frame, and
   a threshold interposed between the elongated track and a floor of the vehicle, the threshold defining a second channel configured to receive the elongated track therein, the threshold defining a sloped flange along each side of the second channel, the sloped flange sloping away from the elongated track toward the floor of the vehicle.

10. The seat mounting system of claim 9 further comprising at least one cap member interposed between the first channel and the vehicle seat frame, the at least one cap member extending at least partially about the first channel to inhibit distortion of the first channel under load of the vehicle seat.

11. The seat mounting system of claim 10 wherein the threshold defines a first notch along one side of the second channel and a second notch along an opposite side of the second channel, the first notch configured to receive therein one end of the at least one cap member and the second notch configured to receive therein an opposite end of the at least one cap member.

12. A seat mounting system for a vehicle, comprising:
a first elongated track mounted to a floor of the vehicle, the first elongated track defining a first length and a continuous first channel along the first length,
a second elongated track mounted to a floor of the vehicle separately and apart from the first elongated track, the second elongated track defining a second length and a continuous second channel along the second length,
a first number of seat coupling members configured to be received and retained within the first channel anywhere along the first length of the first elongated track, each of the first number of seat coupling members configured to be secured to one portion of a vehicle seat frame,
a second number of seat coupling members configured to be received and retained within the second channel anywhere along the second length of the second elongated track, each of the second number of seat coupling members configured to be secured to another portion of the vehicle seat frame different than the one portion,
at least a first cap member interposed between the first channel and the vehicle seat frame, the at least a first cap member extending at least partially about the first channel to inhibit distortion of the first channel under load of the vehicle seat, and
at least a second cap member interposed between the second channel and the vehicle seat frame, the at least a second cap member extending at least partially about the second channel to inhibit distortion of the second channel under load of the vehicle seat.

13. The seat mounting system of claim 12 further comprising:
a first number of sections of the first elongated track mounted to the floor of the vehicle in an end-to-end relationship, and
a second number of sections of the second elongated track mounted to the floor of the vehicle in an end-to-end relationship.

14. The seat mounting system of claim 12 wherein each of the first number of seat coupling members define a head member and a shaft member, the head member of each of the first number of seat coupling members configured to be received and retained within the first channel and the shaft member of each of the first number of seat coupling members configured to be secured to the one portion of the vehicle seat frame,
and wherein each of the second number of seat coupling members define a head member and a shaft member, the head member of each of the second number of seat coupling members configured to be received and retained within the second channel and the shaft member of each of the second number of seat coupling members configured to be secured to the another portion of the vehicle seat frame.

15. A seat mounting system for a vehicle, comprising:
a first elongated track mounted to a floor of the vehicle, the first elongated track defining a first length and a continuous first channel along the first length,
a second elongated track mounted to a floor of the vehicle separately and apart from the first elongated track, the second elongated track defining a second length and a continuous second channel along the second length,
a first number of seat coupling members configured to be received and retained within the first channel anywhere along the first length of the first elongated track, each of the first number of seat coupling members configured to be secured to one portion of a vehicle seat frame,
a second number of seat coupling members configured to be received and retained within the second channel anywhere along the second length of the second elongated track, each of the second number of seat coupling members configured to be secured to another portion of the vehicle seat frame different than the one portion,
a first threshold interposed between the first elongated track and a floor of the vehicle, the first threshold defining a third channel configured to receive the first elongated track therein,
a second threshold interposed between the second elongated track and the floor of the vehicle, the second threshold defining a fourth channel therein configured to receive the second elongated track therein,
at least a first cap member interposed between the first channel and the vehicle seat frame, the at least a first cap member extending at least partially about the first channel to inhibit distortion of the first channel under load of the vehicle seat, and
at least a second cap member interposed between the second channel and the vehicle seat frame, the at least a second cap member extending at least partially about the second channel to inhibit distortion of the second channel under load of the vehicle seat.

16. The seat mounting system of claim 15 wherein the first threshold defines a first notch along one side of the third channel and a second notch along an opposite side of the third channel, the first notch defined in the first threshold configured to receive therein one end of the at least a first cap member and the second notch defined in the first threshold configured to receive therein an opposite end of the at least a first cap member,
and wherein the second threshold defines a first notch along one side of the fourth channel and a second notch along an opposite side of the fourth channel, the first notch defined in the second threshold configured to receive therein one end of the at least a second cap member and the second notch defined in the second threshold configured to receive therein an opposite end of the at least a second cap member.

* * * * *